United States Patent
Wang

(10) Patent No.: US 11,296,915 B2
(45) Date of Patent: *Apr. 5, 2022

(54) REFERENCE SIGNAL TRANSMISSION METHOD AND USER EQUIPMENT

(71) Applicant: Huawei Device Co., Ltd., Guangdong (CN)

(72) Inventor: Jian Wang, Beijing (CN)

(73) Assignee: Huawei Device Co., Ltd., Dongguan (CN)

( * ) Notice: Subject to any disclaimer, the term of this patent is extended or adjusted under 35 U.S.C. 154(b) by 203 days.

This patent is subject to a terminal disclaimer.

(21) Appl. No.: 16/823,623

(22) Filed: Mar. 19, 2020

(65) Prior Publication Data

US 2020/0287766 A1  Sep. 10, 2020

Related U.S. Application Data

(63) Continuation of application No. 15/208,249, filed on Jul. 12, 2016, now Pat. No. 10,652,063, which is a
(Continued)

(51) Int. Cl.
*H04W 76/14* (2018.01)
*H04W 76/11* (2018.01)
(Continued)

(52) U.S. Cl.
CPC ........ *H04L 27/2613* (2013.01); *H04L 5/0048* (2013.01); *H04W 76/11* (2018.02); *H04W 76/14* (2018.02); *H04W 88/08* (2013.01)

(58) Field of Classification Search
None
See application file for complete search history.

(56) References Cited

U.S. PATENT DOCUMENTS

| 7,515,562 B2 | 4/2009 | Lim et al. |
| 9,054,930 B2 | 6/2015 | Seo et al. |

(Continued)

FOREIGN PATENT DOCUMENTS

| CN | 101841845 A | 9/2010 |
| CN | 102334320 A | 1/2012 |

(Continued)

OTHER PUBLICATIONS

3GPP TS 36.213 V12.0 0 (Dec. 2013),3rd Generation Partnership Project;Technical Specification Group Radio Access Network,Evolved Universal Terrestrial Radio Access (E-UTRA); Physical layer procedures(Release 12),total 186 pages.

(Continued)

*Primary Examiner* — Edan Orgad
*Assistant Examiner* — Emmanuel K Maglo

(57) ABSTRACT

Embodiments of the present invention provide a reference signal transmission method and user equipment. The method includes: determining, by a first user equipment, a first identifier related to the first user equipment; determining, by the first user equipment, a first cyclic shift indication from to-be-selected cyclic shift indications according to the first identifier; determining, by the first user equipment, first reference signal according to the first cyclic shift indication and a preset base sequence; and sending, by the first user equipment, the first reference signal to second user equipment, thereby implementing reference signal transmission in D2D communication.

20 Claims, 5 Drawing Sheets

Related U.S. Application Data continuation of application No. PCT/CN2014/070534, filed on Jan. 13, 2014.

(51) Int. Cl.
*H04L 27/26* (2006.01)
*H04L 5/00* (2006.01)
*H04W 88/08* (2009.01)

(56) References Cited

U.S. PATENT DOCUMENTS

| | | | |
|---|---|---|---|
| 9,763,251 B2* | 9/2017 | Papasakellariou | ............................ H04W 72/0466 |
| 2010/0075693 A1 | 3/2010 | Kishigami et al. | |
| 2011/0051827 A1 | 3/2011 | Cho et al. | |
| 2011/0158191 A1* | 6/2011 | Zhang | ................... H04L 5/0091 370/329 |
| 2011/0206089 A1* | 8/2011 | Cho | ................... H04W 72/0413 375/141 |
| 2011/0267972 A1 | 11/2011 | Yoon et al. | |
| 2011/0305179 A1 | 12/2011 | Wang et al. | |
| 2011/0317569 A1 | 12/2011 | Kneckt et al. | |
| 2012/0039409 A1 | 2/2012 | Popovic et al. | |
| 2012/0093098 A1 | 4/2012 | Charbit et al. | |
| 2012/0201275 A1 | 8/2012 | Tiirola et al. | |
| 2012/0213190 A1* | 8/2012 | Yoon | ..................... H04L 5/0035 370/329 |
| 2012/0287877 A1 | 11/2012 | Han et al. | |
| 2013/0121266 A1* | 5/2013 | Ko | ...................... H04L 27/2613 370/329 |
| 2013/0155992 A1* | 6/2013 | Yoon | ..................... H04L 5/0023 370/329 |
| 2013/0196679 A1 | 8/2013 | Widell et al. | |
| 2013/0229989 A1* | 9/2013 | Natarajan | ............. H04L 5/0048 370/329 |
| 2014/0057670 A1 | 2/2014 | Lim et al. | |
| 2014/0064263 A1 | 3/2014 | Cheng et al. | |
| 2014/0177540 A1* | 6/2014 | Novak | .............. H04W 72/0406 370/329 |
| 2014/0185529 A1 | 7/2014 | Lim et al. | |
| 2014/0211736 A1 | 7/2014 | Noh et al. | |
| 2014/0241262 A1* | 8/2014 | Novak | ................ H04W 72/042 370/329 |
| 2015/0003263 A1 | 1/2015 | Senarath et al. | |
| 2015/0078279 A1 | 3/2015 | Ko et al. | |
| 2015/0131566 A1 | 5/2015 | Seo et al. | |
| 2016/0050601 A1 | 2/2016 | Jeong et al. | |
| 2016/0183276 A1* | 6/2016 | Marinier | ............... H04W 72/12 370/329 |
| 2016/0302251 A1* | 10/2016 | Chatterjee | ............. H04W 72/02 |
| 2017/0027014 A1 | 1/2017 | Chae et al. | |
| 2017/0111199 A1 | 4/2017 | Yoon et al. | |
| 2017/0135072 A1 | 5/2017 | Yokomakura et al. | |

FOREIGN PATENT DOCUMENTS

| | | |
|---|---|---|
| CN | 102769592 A | 11/2012 |
| CN | 102986143 A | 3/2013 |
| CN | 103312447 A | 9/2013 |
| CN | 107135058 A | 9/2017 |
| JP | 2008193666 A | 8/2008 |
| JP | 2010525708 A | 7/2010 |
| KR | 20110023710 A | 3/2011 |
| WO | 2013162333 A1 | 10/2013 |
| WO | 2013191367 A1 | 12/2013 |
| WO | 2015065014 A1 | 5/2015 |

OTHER PUBLICATIONS

R1-134721 Ericsson,"Synchronization Signals Design for D2D Discovery and Communication",3GPP TSG RAN WG1 Meeting #74bis,Guangzhou, China, Oct. 7-11, 2013,total 8 pages.
3GPP TS 36.331 V12.0.0 (Dec. 2013),3rd Generation Partnership Project;Technical Specification Group Radio Access Network,Evolved Universal Terrestrial Radio Access (E-UTRA); Radio Resource Control (RRC);Protocol specification (Release 12),total 348 pages.
R1-135321 Qualcomm Incorporated,"Signal Design for D2D Broadcast Communication",3GPP TSG-RAN WG1 #75 ,Nov. 11 15, 2013,total 4 pages.
R1-135805 Ericsson,"On Scrambling of D2D Physical Channels",3GPP TSG RAN WG1 Meeting #75,San Francisco, USA, Nov. 11-15, 2013,total 5 pages.
R1-135324,qualcomm incorporated :"reference signal design for discovery", Nov. 13, 2013,total 7 pages.
R1 -135496,General dynamics broadband uk:"prose device to device discovery sequence design", Nov. 13, 2013,total 4 pages.
R1-133185 ETRI,"Considerations on Pilot Design for D2D Communications",3GPP TSG RAN WG1#74 Barcelona, Spain, Aug. 19 23, 2013,total 4 pages.
3GPP TS 36.211 V12.0.0 (Dec. 2013),3rd Generation Partnership Project;Technical Specification Group Radio Access Network,Evolved Universal Terrestrial Radio Access (E-UTRA); Physical channels and modulation(Release 12),dated Dec. 2013,total 120 pages.
3GPP TS 36.321 V12.0.0 (Dec. 2013),3rd Generation Partnership Project;Technical Specification Group Radio Access Network,Evolved Universal Terrestrial Radio Access (E-UTRA); Medium Access Control (MAC) protocol specification Release 12),dated Dec. 2013,total 57 pages.
3GPP TS 36.300 V12.0.0 (Dec. 2013),3rd Generation Partnership Project;Technical Specification Group Radio Access Network,Evolved Universal Terrestrial Radio Access (E-UTRA) and Evolved Universal Terrestrial Radio Access Network (E-UTRAN);Overall description;Stage 2 (Release 12),dated Dec. 2013,total 208 pages.
R1-135117 Intel Corporation "On message-based D2D discovery signal design", 3GPP TSG RAN WG1 Meeting #75, San Francisco, USA, Nov. 11-15, 2013. total 9 pages.

* cited by examiner

REFERENCE SIGNAL TRANSMISSION METHOD AND USER EQUIPMENT

CROSS-REFERENCE TO RELATED APPLICATIONS

This application is a continuation of U.S. patent application Ser. No. 15/208,249, filed on Jul. 12, 2016, which is a continuation of International Application No. PCT/CN2014/070534, filed on Jan. 13, 2014, both of which are hereby incorporated by reference in their entireties.

TECHNICAL FIELD

Embodiments of the present invention relate to the wireless communications field, and, more specifically, to a reference signal transmission method and a user equipment.

BACKGROUND

A device to device proximity service (D2D ProSe) has become a research subject for a Long Term Evolution (LTE) system.

In a process of designing a physical layer of the D2D ProSe, two major aspects may be classified from a design perspective: discovery signal design, and direct-connection communication design. An objective of the discovery signal design is to enable a user equipment (UE) to identify UEs existing nearby in a network environment. The discovery signal design includes discovery signal sending and discovery signal receiving. An objective of the direct-connection communication design is to design a direct-connection communication procedure between UEs, including a series of procedures such as call initiation, channel sounding, channel feedback, resource scheduling, data transmission, and call completion.

When a UE receives a discovery signal or a direct-connection communication signal, the UE needs to perform channel estimation by using a reference signal, to perform subsequent demodulation and decoding processing.

Therefore, how to implement reference signal transmission in D2D communication needs to be resolved urgently.

SUMMARY

Embodiments of the present invention provide a reference signal transmission method and a user equipment, to implement reference signal transmission in D2D communication.

According to a first aspect, a reference signal transmission method is provided, including: determining, by a first user equipment, a first identifier related to the first user equipment; determining, by the first user equipment, a first cyclic shift indication from to-be-selected cyclic shift indications according to the first identifier; determining, by the first user equipment, a first reference signal according to the first cyclic shift indication and a preset base sequence; and sending, by the first user equipment, the first reference signal to second user equipment.

With reference to the first aspect, in an implementation manner of the first aspect, the determining, by a first user equipment, a first identifier related to the first user equipment includes: determining, by the first user equipment, the first identifier according to the first identifier carried in a received request sent by the second user equipment.

With reference to the first aspect or the foregoing implementation manner of the first aspect, in another implementation manner of the first aspect, before the determining, by the first user equipment, a first identifier related to the first user equipment, the method further includes: receiving, by the first user equipment, the request sent by the second user equipment, where the request carries the first identifier.

With reference to the first aspect or any one of the foregoing implementation manners of the first aspect, in another implementation manner of the first aspect, the determining, by the first user equipment, a first identifier related to the first user equipment includes: selecting, by the first user equipment according to a preset rule from an identifier related to the first user equipment, an identifier as the first identifier.

With reference to the first aspect or any one of the foregoing implementation manners of the first aspect, in another implementation manner of the first aspect, the determining, by the first user equipment, a first reference signal according to the first cyclic shift indication and a preset base sequence includes: obtaining, by the first user equipment, the first reference signal after performing a cyclic shift on the base sequence according to the first cyclic shift indication.

With reference to the first aspect or any one of the foregoing implementation manners of the first aspect, in another implementation manner of the first aspect, the determining, by the first user equipment, a first cyclic shift indication from to-be-selected cyclic shift indications according to the first identifier includes: determining, by the first user equipment, a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=mod(m_1, n)$.

With reference to the first aspect or any one of the foregoing implementation manners of the first aspect, in another implementation manner of the first aspect, the first identifier includes one identifier of the first user equipment, and $m_1$ is equal to a value of the first identifier.

With reference to the first aspect or any one of the foregoing implementation manners of the first aspect, in another implementation manner of the first aspect, the first identifier includes at least two identifiers of the first user equipment, and $m_1$ is a value determined on a basis of values of the at least two identifiers according to a preset operation rule.

With reference to the first aspect or any one of the foregoing implementation manners of the first aspect, in another implementation manner of the first aspect, the determining, by the first user equipment, a first cyclic shift indication from to-be-selected cyclic shift indications according to the first identifier includes: determining, by the first user equipment, the first cyclic shift indication according to a value of the first identifier and a value of a first parameter of a resource used to send the first reference signal.

With reference to the first aspect or any one of the foregoing implementation manners of the first aspect, in another implementation manner of the first aspect, the determining, by the first user equipment, the first cyclic shift indication according to a value of the first identifier and a value of a first parameter of a resource used to send the first reference signal includes: determining, by the first user equipment, a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=mod(m_2, n)$.

With reference to the first aspect or any one of the foregoing implementation manners of the first aspect, in another implementation manner of the first aspect, the first parameter includes one or more of the following parameters corresponding to the resource: a frame number, a subframe number, a physical resource block number, or bandwidth.

With reference to the first aspect or any one of the foregoing implementation manners of the first aspect, in another implementation manner of the first aspect, the determining, by the first user equipment, the first cyclic shift indication according to a value of the first identifier and a value of a first parameter of a resource used to send the first reference signal includes: determining, by the first user equipment, the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

With reference to the first aspect or any one of the foregoing implementation manners of the first aspect, in another implementation manner of the first aspect, the determining, by the first user equipment, a first cyclic shift indication from to-be-selected cyclic shift indications according to the first identifier includes: determining, by the first user equipment, the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

With reference to the first aspect or any one of the foregoing implementation manners of the first aspect, in another implementation manner of the first aspect, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

According to a second aspect, a reference signal transmission method is provided, including: determining, by second user equipment, a first identifier related to a first user equipment; determining, by the second user equipment, a first cyclic shift indication from to-be-selected cyclic shift indications according to the first identifier; determining, by the second user equipment, a second reference signal according to the first cyclic shift indication and a preset base sequence; and performing, by the second user equipment, channel sounding on a channel according to the second reference signal and a received first reference signal transmitted through the channel, where the first reference signal is sent by the first user equipment.

With reference to the second aspect, in an implementation manner of the second aspect, the determining, by a second user equipment, a first identifier related to first user equipment includes: determining, by the second user equipment, the first identifier according to a request that is sent to the first user equipment and that carries the first identifier.

With reference to the second aspect or the foregoing implementation manner of the second aspect, in another implementation manner of the second aspect, before the determining, by second user equipment, a first identifier related to first user equipment, the method further includes: sending, by the second user equipment, the request to the first user equipment, where the request carries the first identifier.

With reference to the second aspect or any one of the foregoing implementation manners of the second aspect, in another implementation manner of the second aspect, the determining, by the second user equipment, a second reference signal according to the first cyclic shift indication and a preset base sequence includes: obtaining, by the second user equipment, the second reference signal after performing a cyclic shift on the base sequence according to the first cyclic shift indication.

With reference to the second aspect or any one of the foregoing implementation manners of the second aspect, in another implementation manner of the second aspect, the determining, by the second user equipment, a first cyclic shift indication from to-be-selected cyclic shift indications according to the first identifier includes: determining, by the second user equipment, a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=mod(m_1, n)$.

With reference to the second aspect or any one of the foregoing implementation manners of the second aspect, in another implementation manner of the second aspect, the first identifier includes one identifier of the first user equipment, and $m_1$ is equal to a value of the first identifier.

With reference to the second aspect or any one of the foregoing implementation manners of the second aspect, in another implementation manner of the second aspect, the first identifier includes at least two identifiers of the first user equipment, and $m_1$ is a value determined on a basis of values of the at least two identifiers according to a preset operation rule.

With reference to the second aspect or any one of the foregoing implementation manners of the second aspect, in another implementation manner of the second aspect, the determining, by the second user equipment, a first cyclic shift indication from to-be-selected cyclic shift indications according to the first identifier includes: determining, by the second user equipment, the first cyclic shift indication according to a value of the first identifier and a value of a first parameter of a resource used to send the first reference signal.

With reference to the second aspect or any one of the foregoing implementation manners of the second aspect, in another implementation manner of the second aspect, the determining, by the second user equipment, the first cyclic shift indication according to a value of the first identifier and a value of a first parameter of a resource used to send the first reference signal includes: determining, by the second user equipment, a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=mod(m_2, n)$.

With reference to the second aspect or any one of the foregoing implementation manners of the second aspect, in another implementation manner of the second aspect, the first parameter includes one or more of the following parameters corresponding to the resource: a frame number, a subframe number, a physical resource block number, or bandwidth.

With reference to the second aspect or any one of the foregoing implementation manners of the second aspect, in another implementation manner of the second aspect, the determining, by the second user equipment, the first cyclic shift indication according to a value of the first identifier and a value of a first parameter of a resource used to send the first reference signal includes: determining, by the second user equipment, the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

With reference to the second aspect or any one of the foregoing implementation manners of the second aspect, in another implementation manner of the second aspect, the determining, by the second user equipment, a first cyclic shift indication from to-be-selected cyclic shift indications according to the first identifier includes: determining, by the second user equipment, the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

With reference to the second aspect or any one of the foregoing implementation manners of the second aspect, in another implementation manner of the second aspect, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

According to a third aspect, a user equipment is provided, including: a first determining unit, configured to determine a first identifier related to the user equipment; a second determining unit, configured to determine a first cyclic shift indication from to-be-selected cyclic shift indications according to the first identifier determined by the first determining unit; a third determining unit, configured to determine a first reference signal according to the first cyclic shift indication determined by the second determining unit and a preset base sequence; and a sending unit, configured to send the first reference signal determined by the third determining unit to second user equipment.

With reference to the third aspect, in an implementation manner of the third aspect, the user equipment further includes a receiving unit, where the receiving unit is configured to receive a request that is sent by the second user equipment and that carries the first identifier; and the first determining unit is specifically configured to determine the first identifier according to the first identifier carried in the request received by the receiving unit.

With reference to the third aspect or the foregoing implementation manner of the third aspect, in another implementation manner of the third aspect, the user equipment further includes: the receiving unit, configured to receive the request sent by the second user equipment, where the request carries the first identifier.

With reference to the third aspect or any one of the foregoing implementation manners of the third aspect, in another implementation manner of the third aspect, the first determining unit is specifically configured to select, according to a preset rule from an identifier related to the user equipment, an identifier as the first identifier.

With reference to the third aspect or any one of the foregoing implementation manners of the third aspect, in another implementation manner of the third aspect, the third determining unit is specifically configured to obtain the first reference signal after performing a cyclic shift on the base sequence according to the first cyclic shift indication.

With reference to the third aspect or any one of the foregoing implementation manners of the third aspect, in another implementation manner of the third aspect, the second determining unit is specifically configured to determine a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=\mathrm{mod}(m_1, n)$.

With reference to the third aspect or any one of the foregoing implementation manners of the third aspect, in another implementation manner of the third aspect, the first identifier includes one identifier of the user equipment, and $m_1$ is equal to a value of the first identifier.

With reference to the third aspect or any one of the foregoing implementation manners of the third aspect, in another implementation manner of the third aspect, the first identifier includes at least two identifiers of the user equipment, and $m_1$ is a value determined on a basis of values of the at least two identifiers according to a preset operation rule.

With reference to the third aspect or any one of the foregoing implementation manners of the third aspect, in another implementation manner of the third aspect, the second determining unit is specifically configured to determine the first cyclic shift indication according to a value of the first identifier and a value of a first parameter of a resource used to send the first reference signal.

With reference to the third aspect or any one of the foregoing implementation manners of the third aspect, in another implementation manner of the third aspect, the second determining unit is further specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=\mathrm{mod}(m_2, n)$.

With reference to the third aspect or any one of the foregoing implementation manners of the third aspect, in another implementation manner of the third aspect, the first parameter includes one or more of the following parameters corresponding to the resource: a frame number, a subframe number, a physical resource block number, or bandwidth.

With reference to the third aspect or any one of the foregoing implementation manners of the third aspect, in another implementation manner of the third aspect, the second determining unit is further specifically configured to determine the first cyclic shift indication according to the value of the first identifier, the value of the first parameter, and a first offset value, where the first offset value is a cell identifier value of a cell in which the user equipment is located, an identifier value of a D2D cluster to which the user equipment belongs, or an offset value configured by a first communications device.

With reference to the third aspect or any one of the foregoing implementation manners of the third aspect, in another implementation manner of the third aspect, the second determining unit is specifically configured to determine the first cyclic shift indication according to a value of the first identifier and a first offset value, where the first offset value is a cell identifier value of a cell in which the user equipment is located, an identifier value of a D2D cluster to which the user equipment belongs, or an offset value configured by a first communications device.

With reference to the third aspect or any one of the foregoing implementation manners of the third aspect, in another implementation manner of the third aspect, the first identifier includes one or more of the following identifiers of the user equipment: a D2D identifier, an IMSI, a TMSI, a D2D user group identifier, a service type identifier, or a D2D cluster identifier, where the D2D user group identifier is used to indicate a D2D user group to which the user equipment belongs, and the service type identifier is used to indicate a service type provided by the user equipment.

According to a fourth aspect, a first user equipment is provided, including: a first determining unit, configured to determine a first identifier related to the first user equipment; a second determining unit, configured to determine a first cyclic shift indication from to-be-selected cyclic shift indications according to the first identifier determined by the first determining unit; a third determining unit, configured to determine a second reference signal according to the first cyclic shift indication determined by the second determining unit and a preset base sequence; a receiving unit, configured to receive a first reference signal transmitted through a channel, where the first reference signal is sent by the first user equipment; and a channel sounding unit, configured to perform sounding channel on a channel according to the second reference signal determined by the third determining unit and the first reference signal received by the receiving unit.

With reference to the fourth aspect, in an implementation manner of the fourth aspect, the user equipment further includes a sending unit, where the sending unit is configured to send, to the first user equipment, a request that carries the first identifier; and the first determining unit is specifically configured to determine the first identifier according to the request that is sent by the sending unit and that carries the first identifier.

With reference to the fourth aspect or the foregoing implementation manner of the fourth aspect, in another implementation manner of the fourth aspect, the user equipment further includes: the sending unit, configured to send the request to the first user equipment, where the request carries the first identifier.

With reference to the fourth aspect or any one of the foregoing implementation manners of the fourth aspect, in another implementation manner of the fourth aspect, the third determining unit is specifically configured to obtain the second reference signal after performing a cyclic shift on the base sequence according to the first cyclic shift indication.

With reference to the fourth aspect or any one of the foregoing implementation manners of the fourth aspect, in another implementation manner of the fourth aspect, the second determining unit is specifically configured to determine a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=mod(m_1, n)$.

With reference to the fourth aspect or any one of the foregoing implementation manners of the fourth aspect, in another implementation manner of the fourth aspect, the first identifier includes one identifier of the first user equipment, and $m_1$ is equal to a value of the first identifier.

With reference to the fourth aspect or any one of the foregoing implementation manners of the fourth aspect, in another implementation manner of the fourth aspect, the first identifier includes at least two identifiers of the first user equipment, and $m_1$ is a value determined on a basis of values of the at least two identifiers according to a preset operation rule.

With reference to the fourth aspect or any one of the foregoing implementation manners of the fourth aspect, in another implementation manner of the fourth aspect, the second determining unit is specifically configured to determine the first cyclic shift indication according to a value of the first identifier and a value of a first parameter of a resource used to send the first reference signal.

With reference to the fourth aspect or any one of the foregoing implementation manners of the fourth aspect, in another implementation manner of the fourth aspect, the second determining unit is further specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=mod(m_2, n)$.

With reference to the fourth aspect or any one of the foregoing implementation manners of the fourth aspect, in another implementation manner of the fourth aspect, the first parameter includes one or more of the following parameters corresponding to the resource: a frame number, a subframe number, a physical resource block number, or bandwidth.

With reference to the fourth aspect or any one of the foregoing implementation manners of the fourth aspect, in another implementation manner of the fourth aspect, the second determining unit is further specifically configured to determine the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

With reference to the fourth aspect or any one of the foregoing implementation manners of the fourth aspect, in another implementation manner of the fourth aspect, the second determining unit is further specifically configured to determine the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

With reference to the fourth aspect or any one of the foregoing implementation manners of the fourth aspect, in another implementation manner of the fourth aspect, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

In the embodiments of the present invention, a first user equipment selects a first cyclic shift indication according to a first identifier related to the first user equipment, generates a first reference signal on a basis of the first cyclic shift indication and a preset base sequence, and then sends the first reference signal to second user equipment, thereby implementing reference signal transmission in D2D communication.

BRIEF DESCRIPTION OF THE DRAWINGS

To describe the technical solutions in the embodiments of the present invention more clearly, the following briefly introduces the accompanying drawings required for describing the embodiments of the present invention. The accompanying drawings in the following description show merely some embodiments of the present invention, and a person of ordinary skill in the art may still derive other drawings from these accompanying drawings without creative efforts.

DETAILED DESCRIPTION OF ILLUSTRATIVE EMBODIMENTS

Figure 1:
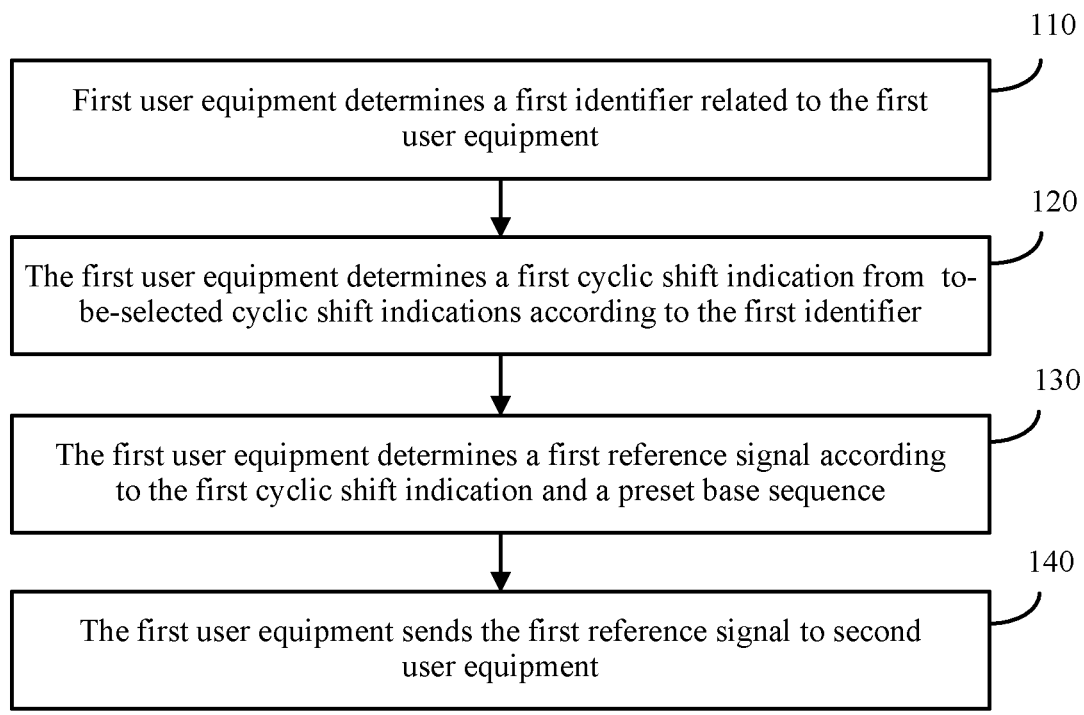
FIG. 1 is a schematic flowchart of a reference signal transmission method according to an embodiment of the present invention.

The following clearly describes the technical solutions in the embodiments of the present invention with reference to the accompanying drawings in the embodiments of the present invention. The described embodiments are some but not all of the embodiments of the present invention. All other embodiments obtained by a person of ordinary skill in the art on a basis of the embodiments of the present invention without creative efforts shall fall within the protection scope of the present invention.

It should be understood that the technical solutions of the present invention may be applied to various communications systems, such as a Global System for Mobile Communications (GSM), a Code Division Multiple Access (CDMA) system, a Wideband Code Division Multiple Access (WCDMA) system, a general packet radio service (GPRS), and an LTE system, a Long Term Evolution Advanced (LTE-A) system, and a Universal Mobile Telecommunications System (UMTS).

It should be understood that in the embodiments of the present invention, user equipment includes but is not limited to a mobile station (MS), a mobile terminal, a mobile telephone, a handset, portable equipment, and the like. The user equipment may communicate with one or more core networks by using a radio access network (RAN). For example, the user equipment may be a mobile telephone (or referred to as a "cellular" telephone), or a computer having a wireless communication function; the user equipment may further be a portable, pocket-sized, handheld, computer built-in, or in-vehicle mobile apparatus.

In the embodiments of the present invention, a base station may be a base station (BTS) in the GSM or CDMA, may also be a base station (NodeB) in the WCDMA, and may further be an evolved NodeB (eNB or e-NodeB) in the LTE, which is not limited in the embodiments of the present invention.

In the LTE, the user equipment uses an uplink reference signal to perform channel sounding. The uplink reference signal may be a demodulation reference signal (DMRS) or may be a sounding reference signal (SRS). When the user equipment sends an uplink signal, the user equipment selects a cyclic shift indication from multiple to-be-selected cyclic shift indications and performs a cyclic shift on a base sequence according to the selected cyclic shift indication, to generate a reference signal. Reference signals generated according to different cyclic shift indications are orthogonal to each other. Therefore, interference between the reference signals sent on a same time-frequency resource is avoided.

For reference signal transmission in D2D communication, reference may be made to a reference signal transmission manner in LTE uplink. Specifically, to avoid interference between reference signals sent between user equipments using a same time-frequency resource, a manner similar to the foregoing manner of setting to-be-selected cyclic shift indications may be alternatively used for designing. For example, eight cyclic shift indications are preconfigured, when two user equipments located at a transmit end send reference signals on a same time-frequency resource, each of the two user equipments may randomly select one from the eight cyclic shift indications to generate reference signals. According to this design manner, in the D2D communication, a probability that interference occurs between the reference signals sent by the two user equipments on the same time-frequency resource is reduced significantly.

However, as shown in the foregoing example, when the two user equipments select a same cyclic shift indication, the reference signals sent by the two user equipments still interfere with each other, and the probability is 1/64. On a basis of the foregoing, the embodiments of the present invention provide a reference signal transmission method, to further reduce the interference.

FIG. 1 is a schematic flowchart of a reference signal transmission method according to an embodiment of the present invention. The method in FIG. 1 may be executed by a first user equipment.

110. The first user equipment determines a first identifier related to the first user equipment.

The first identifier may be an identifier specially configured for at least one user equipment including the first user equipment. Specifically, the first identifier may be an identifier specially configured for the first user equipment. For example, the first identifier may include one or more of the following identifiers: a D2D identifier, an international mobile subscriber identity (IMSI), or a temporary mobile subscriber identity (TMSI) of the first user equipment. Alternatively, the first identifier may be a joint identifier configured for a same group or a same type of user equipments including the first user equipment. For example, the first identifier may include one or more of the following identifiers: a D2D user group identifier of a D2D user group to which the first user equipment belongs, a service type identifier of a service type provided by the first user equipment, or a D2D cluster identifier of a D2D cluster to which the first user equipment belongs.

120. The first user equipment determines a first cyclic shift indication from to-be-selected cyclic shift indications according to the first identifier.

It should be understood that the first cyclic shift indication is one to-be-selected cyclic shift indication, for example, which may be the second cyclic shift indication among eight to-be-selected cyclic shift indications.

130. The first user equipment determines a first reference signal according to the first cyclic shift indication and a preset base sequence.

It should be understood that reference signals generated on a basis of different cyclic shift indications among to-be-selected cyclic shift indications are orthogonal. Specifically, when two user equipments (user equipment 1 and user equipment 2) send reference signals on a same time-frequency resource, if the reference signals sent by the user equipment 1 and the user equipment 2 are generated on a basis of different cyclic shift indications, the reference signals sent by the user equipment 1 and the user equipment 2 are orthogonal and do not interfere with each other.

It should be understood that the base sequence may be preconfigured and multiple cyclic shift indications are configured for the base sequence. When user equipment at a transmit end selects a cyclic shift indication, the user equipment may perform a cyclic shift on the base sequence according to the cyclic shift indication to generate a reference signal.

It should also be understood that this embodiment of the present invention sets no specific limitation to a quantity of to-be-selected cyclic shift indications; for example, the quantity may be eight, ten, or any other number.

It should be noted that the first identifier may be one or more identifiers related to the first user equipment. For example, the first identifier may be the D2D identifier of the first user equipment, or the first identifier includes the D2D identifier of the first user equipment and the D2D user group identifier.

140. The first user equipment sends the first reference signal to a second user equipment.

In this embodiment of the present invention, the first user equipment selects a first cyclic shift indication according to a first identifier related to the first user equipment, generates a first reference signal on a basis of the first cyclic shift indication and a preset base sequence, and then sends the first reference signal to second user equipment, thereby implementing reference signal transmission in D2D communication.

Further, the first user equipment selects a cyclic shift indication according to the first identifier of the first user equipment. The first identifier is related to the first user equipment, and first identifiers of different user equipments are generally different from each other. Therefore, there is a low probability that the different user equipments select a same cyclic shift indication on a basis of the first identifiers of the different user equipments. Accordingly, there is a low probability that a conflict occurs between generated reference signals, and interference between the reference signals sent between the user equipments in the D2D communication is reduced.

It should be understood that the reference signals may be DMRSs, or may be other reference signals, for example, SRSs, and this embodiment of the present invention sets no specific limitation thereto. Specifically, when the reference signals are the DMRSs, the DMRSs are generally carried in digital signals transmitted between the user equipments and sent, that is, the DMRSs and the digital signals are sent on a same frequency resource. When the reference signals are SRSs, the SRSs may be sent according to an SRS parameter that is pre-defined and that is used to indicate a resource occupied by the SRSs, where the SRS parameter includes sounding bandwidth, an SRS transmission interval, a frequency hopping mode, and the like.

Optionally, the first user equipment may perform calculations according to a value of the first identifier and according to a predetermined operation rule, and a one-to-one correspondence exists between a calculation result and to-be-selected cyclic shift indications. Specifically, it is assumed that n cyclic shift indications are preset, a modulo operation may be performed on the value of the first identifier of the first user equipment, and a remainder changes from 0 to n−1 (including 0 and n−1). Then, a correspondence is set up between n remainder results and the n cyclic shift indications. Further, when the first cyclic shift indication is selected, the first cyclic shift indication is used to perform the cyclic shift on the base sequence, and the first reference signal (which may also be called a first reference sequence) can be generated.

It should be understood that the modulo operation is merely an implementation manner of the predetermined operation rule. Another operation rule may be used. For example, if the value of the first identifier is 20 and n=8, the $(2+0)^{th}$ cyclic shift indication among the n cyclic shift indications is selected as the first cyclic shift indication. Similarly, when the value of the first identifier is 211, the $(2+1+1)^{th}$ cyclic shift indication is selected as the first cyclic shift indication. When the first identifier includes two identifiers (which are separately identifier 1 and identifier 2), a value of the identifier 1 is 30, and a value of the identifier 2 is 14, the $(3+0+1+4)^{th}$ cyclic shift indication is selected as the first cyclic shift indication.

In this embodiment of the present invention, the first user equipment selects a cyclic shift indication according to a value of the first identifier of the first user equipment. The first identifier is related to the first user equipment, and values of first identifiers of different user equipments are generally different from each other. Therefore, there is a low probability that the different user equipments select the same cyclic shift indication on a basis of the values of the first identifiers of the different user equipments. Accordingly, there is a low probability that a conflict occurs between generated reference signals, and interference between the reference signals sent between the user equipments in the D2D communication is reduced.

Optionally, in another embodiment, step 120 includes: determining, by the first user equipment, a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and k=mod($m_1$, n).

It should be understood that mod(x, y) indicates a remainder obtained by dividing x by y.

Optional manner 1: The first identifier includes one identifier of the first user equipment, and $m_1$ is equal to the value of the first identifier.

For example, if the first identifier is a D2D identifier, a value of the D2D identifier is ID_d2d, and n=8, $m_1$=ID_d2d, and k=mod(ID_d2d, 8).

For another example, if the first identifier is a D2D user group identifier, a value of the D2D user group identifier is ID_d2d_group, and n=8, $m_1$=ID_d2d_group, and k=mod(ID_d2d_group, 8).

For another example, if the first identifier is a service type identifier, a value of the service type identifier is ID_d2d_service, and n=8, $m_1$=ID_d2d_service, and k=mod(ID_d2d_service, 8).

For another example, if the first identifier is an IMSI, and n=8, $m_1$=IMSI, and k=mod(IMSI, 8).

For another example, if the first identifier a TMSI, and n=8, $m_1$=TMSI, and k=mod(TMSI, 8).

Optional manner 2: The first identifier includes at least two identifiers of the first user equipment, and $m_1$ is a value determined on a basis of values of the at least two identifiers according to a preset operation rule.

In this optional manner, multiple identifiers related to the first user equipment are considered simultaneously, so that the probability that the different user equipments select the same cyclic shift indication is further reduced, and the interference between the reference signals sent between the user equipments is further reduced.

For example, the first identifier includes a D2D identifier and a D2D user group identifier. A value of the D2D identifier is ID_d2d. A value of the D2D user group identifier is ID_d2d_group. If n=8, and the preset operation rule is adding the values of the two identifiers, $m_1$=ID_d2d+ID_d2d_group, and k=mod(ID_d2d+ID_d2d_group, 8).

It should be understood that the foregoing optional manners are merely used as examples for description. In actuality, n may be selected as any natural number greater than or equal to 2. In addition, if the first identifier is one identifier of the first user equipment, $m_1$ may be obtained by using the preset operation rule. For example, if the value of the first identifier is hexadecimal, the value of the first identifier may be converted into a decimal value, and then a modulo operation is performed. If the first identifier includes multiple identifiers of the first user equipment, the foregoing preset operation rule includes but is not limited to addition. For example, values of different identifiers may be multiplied by weight values of the different identifiers, and then multiplication results are added.

Optionally, in an embodiment, step 120 includes: determining, by the first user equipment, the first cyclic shift indication according to a value of the first identifier and a first offset value, where the first offset value is a cell identifier (or called a cell ID) value of a cell in which the first user equipment is located, an identifier value of a D2D cluster to which the first user equipment belongs, or an offset value configured by a first communications device.

It should be noted that when the first offset value is the cell identifier value of the cell in which the first user equipment is located, the first user equipment and the second user equipment may be located in the same cell. Therefore, the second user equipment can obtain the first offset value by using the cell identifier value of the cell in which the second user equipment is located.

When the first offset value is the identifier value of the D2D cluster to which the first user equipment belongs, the first user equipment and the second user equipment may be located in the same D2D cluster. Therefore, the second user equipment can obtain the first offset value by using an identifier of the D2D cluster in which the second user equipment is located.

Alternatively, the first offset value may be the offset value configured by the first communications device. The first communications device may be a base station, and the base station configures the offset value for the first user equipment and the second user equipment simultaneously. When the first user equipment and the second user equipment are located in a same D2D cluster, the first communications device may be a cluster head of the D2D cluster.

For example, the offset value is indicated as N_offset. The first cyclic shift indication may be a [mod(ID_d2d+N_offset, 8)]$^{th}$ cyclic shift indication among the eight to-be-selected cyclic shift indications, or the first cyclic shift indication may be a [mod(ID_d2d+ID_d2d_group+N_offset, 8)]$^{th}$ cyclic shift indication among the eight to-be-selected cyclic shift indications. An objective of this embodiment of the present invention is to reduce a probability that user equipments select the same cyclic shift indication, but not to limit a specific operation manner. In actuality, all operation manners that can achieve the objective shall fall within the protection scope of this embodiment of the present invention.

Optionally, in another embodiment, step 120 includes: determining, by the first user equipment, the first cyclic shift indication according to a value of the first identifier and a first parameter of a resource used to send the first reference signal.

It should be understood that the first parameter may be used to indicate a time domain location and/or a frequency domain location of the resource used to send the first reference signal.

Optionally, the first parameter may be a parameter of a resource for sending first data, where the first data is data sent together with the first reference signal. For example, if the first reference signal is a DMRS, and the DMRS is generally mixed and sent together with data transmitted between user equipments, the first parameter may be a parameter of a resource for sending the transmitted data.

In this embodiment of the present invention, the first user equipment selects a cyclic shift indication according to the value of the first identifier of the first user equipment and the first parameter of the resource used to send the first reference signal. The first identifier is related to the first user equipment, and values of first identifiers of different user equipments are generally different from each other. Therefore, there is a low probability that the different user equipments select the same cyclic shift indication on a basis of the values of the first identifiers of the different user equipments. Accordingly, there is a low probability that a conflict occurs between generated reference signals, and interference between the reference signals sent by the user equipments in the D2D communication is reduced.

Channel estimation performance using reference signals that are determined according to different cyclic shift indications may be good or poor. Channel estimation performance using a reference signal determined by the first user equipment according to the first identifier may be relatively poor. If the first reference signal is determined according to the first identifier and the preset operation rule only, and the selected first cyclic shift indication is relatively fixed because the first identifier is relatively fixed, channel estimation performance using the first reference signal determined each time may be relatively poor. In this embodiment of the present invention, when the first cyclic shift indication is selected, not only the first identifier of the first user equipment is considered, but a first parameter of a resource used to send a reference signal is also considered. The resource for sending the reference signal changes in real time, so that a first cyclic shift indication selected by same user equipment is not fixed, avoiding a case in which the channel estimation performance using the first reference signal determined each time is relatively poor.

The resource for sending the first reference signal may be a time domain resource and/or a frequency domain resource. The first parameter of the resource used to send the first reference signal may be one or more of the following parameters corresponding to the resource: a frame number, a subframe number, a physical resource block (PRB) number, or bandwidth.

Optionally, in another embodiment, the determining, by the first user equipment, the first cyclic shift indication according to a value of the first identifier and a first parameter of a resource used to send the first reference signal includes: determining, by the first user equipment, a k$^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the first parameter according to a preset operation rule, and k=mod($m_2$, n).

In this embodiment of the present invention, the first user equipment selects a cyclic shift indication according to the value of the first identifier of the first user equipment and the first parameter of the resource used to send the first reference signal. The first identifier is related to the first user equipment, and values of first identifiers of different user equipments are generally different from each other. Therefore, there is a low probability that the different user equipments select a same cyclic shift indication on a basis of the values of the first identifiers. Accordingly, there is a low probability that a conflict occurs between generated reference signals, and interference between the reference signals sent between the UEs in the D2D communication is reduced.

That n=8, the first identifier is a D2D identifier, and a value of the D2D identifier is ID_d2d is used as an example for description.

Optional manner 1: The first parameter is a number of a subframe occupied by the first reference signal, and the subframe number is indicated as N_subframe. If the preset operation rule is $m_2$=ID_d2d+N_subframe, k=mod(ID_d2d+N_subframe, 8).

Optional manner 2: The first parameter is a number of a frame occupied by the first reference signal, and the frame number is indicated as N_frame. If the preset operation rule is $m_2$=ID_d2d+N_frame, k=mod(ID_d2d+N_frame, 8).

Optional manner 3: The first parameter includes numbers of a subframe and a frame that is occupied by the first reference signal, the subframe number is indicated as N_subframe, and the frame number is indicated as N_frame. If the preset operation rule is $m_2$=ID_d2d+N_frame*10+N_subframe, k=mod(ID_d2d+N_frame*10+N_subframe, 8).

Optional manner 4: The first parameter includes numbers of a subframe and a PRB, and bandwidth that are occupied by the first reference signal, the subframe number is indicated as N_subframe, the bandwidth is indicated as N_bandwidth, and the PRB number is indicated as N_PRB. If the preset operation rule is $m_2$=ID_d2d+N_subframe*N_bandwidth+N_PRB, k=mod(ID_d2d+N_subframe*N_bandwidth+N_PRB, 8).

Optional manner 5: The first parameter includes numbers of a frame and a PRB, and bandwidth that are occupied by the first reference signal, the frame number is indicated as N_frame, the bandwidth is indicated as N_bandwidth, and the PRB number is indicated as N_PRB. If the preset operation rule is $m_2$=ID_d2d+N_frame*N_bandwidth+N_PRB, k=mod(ID_d2d+N_frame*N_bandwidth+N_PRB, 8).

Optional manner 6: The first parameter includes numbers of a frame, a subframe, and a PRB, and bandwidth that are occupied by the first reference signal, the frame number is indicated as N_frame, the subframe number is indicated as N_subframe, the bandwidth is indicated as N_bandwidth, and the PRB number is indicated as N_PRB. If the preset operation rule is $m_2$=ID_d2d+(N_frame*10+N_subframe)*N_bandwidth+N_PRB, k=mod(ID_d2d+(N_frame*10+N_subframe)*N_bandwidth+N_PRB, 8).

It should be understood that the foregoing optional manners are merely used as examples for description. Actually, n may be selected as any natural number greater than or equal to 2. In this embodiment of the present invention, the ID_d2d may be replaced with any first identifier described above; for example, the ID_d2d is replaced with a combination of ID_d2d_group and ID_d2d_service.

Optionally, the determining, by the first user equipment, the first cyclic shift indication according to a value of the first identifier and a first parameter of a resource used to send the first reference signal includes: determining, by the first user equipment, the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

It should be noted that when the first offset value is the cell identifier value of the cell in which the first user equipment is located, the first user equipment and the second user equipment may be located in the same cell. Therefore, the second user equipment can obtain the first offset value by using a cell identifier of the cell in which the second user equipment is located.

When the first offset value is the identifier of the D2D cluster to which the first user equipment belongs, the first user equipment and the second user equipment may be located in the same D2D cluster. Therefore, the second user equipment can obtain the first offset value by using the identifier of the D2D cluster in which the second user equipment is located.

Alternatively, the first offset value may be the offset value configured by the first communications device. The first communications device may be a base station, and the base station configures the offset value for the first user equipment and the second user equipment simultaneously. When the first user equipment and the second user equipment are located in a same D2D cluster, the first communications device may be a cluster head of the D2D cluster.

For example, the offset value is indicated as N_offset. The first cyclic shift indication may be a [mod(ID_d2d+(N_frame*10+N_subframe)*N_bandwidth+N_PRB+N_offset, 8)]$^{th}$ cyclic shift indication among the eight to-be-selected cyclic shift indications, or the first cyclic shift indication may be a [mod(ID_d2d+N_frame*10+N_subframe+N_offset, 8)]$^{th}$ cyclic shift indication among the eight to-be-selected cyclic shift indications. An objective of this embodiment of the present invention is to reduce a probability that different user equipments select a same cyclic shift indication, but not to limit a specific operation manner. Actually, all operation manners that can achieve the objective shall fall within the protection scope of this embodiment of the present invention.

Optionally, step 110 includes: determining, by the first user equipment, the first identifier according to the first identifier carried in a received request sent by the second user equipment.

Specifically, the second user equipment may directly send a request (for example, the request may be a discovery signal request) to surrounding user equipments and add the first identifier to the request. Alternatively, the second user equipment sends a request to a base station, and the base station sends a paging signal to user equipment surrounding the second user equipment and adds the first identifier to the paging signal.

If the second user equipment wants to search around for user equipment that can provide a first D2D service, the second user equipment sends a discovery signal request to surrounding user equipment and adds a D2D service type identifier corresponding to the first D2D service to the discovery signal request. The first user equipment that can provide the D2D service type and receives the discovery signal request and generates the first reference signal according to the D2D service type identifier carried in the discovery signal request.

Alternatively, if the second user equipment wants to search for user equipment that can provide a first D2D service, the second user equipment sends a discovery signal request to a base station and adds a D2D service type identifier corresponding to the first D2D service to the discovery signal request. After receiving the discovery signal request, the base station sends a paging signal to user equipments surrounding the second user equipment and adds the D2D service type identifier to the paging signal. The first user equipment that can provide the D2D service type receives the discovery signal request and generates the first reference signal according to the D2D service type identifier carried in the discovery signal request.

Optionally, step no includes: selecting, by the first user equipment according to a preset rule from an identifier related to the first user equipment, an identifier as the first identifier.

Specifically, the first user equipment has multiple identifiers related to the first user equipment, and the first user equipment periodically sends around a reference signal. When the first user equipment is ready to send the reference signal, the first user equipment may select an identifier from the multiple related identifiers randomly or according to a predetermined sequence, and determine the selected identifier as the first cyclic shift indication.

For example, the first user equipment can provide three service types. To enable surrounding user equipment that requires a service type among the three service types to find the first user equipment, the first user equipment periodically sends a reference signal, where the reference signal sequentially carries service type identifiers of the three service types. The surrounding user equipment may demodulate the reference signal in a blind detection manner.

The foregoing describes in detail the reference signal transmission method from a perspective of a first user equipment (a transmit end of a reference signal) according to the embodiment of the present invention with reference to FIG. 1. The following describes a reference signal transmission method from a perspective of a second user equipment (a receive end of a reference signal) according to an embodiment of the present invention with reference to FIG. 2.

It should be understood that interactions, related features, functions, and the like of the first user equipment and the second user equipment that are described from a second user equipment side are corresponding to descriptions from a first user equipment side. For brevity, repeated description is omitted appropriately.

Figure 2:
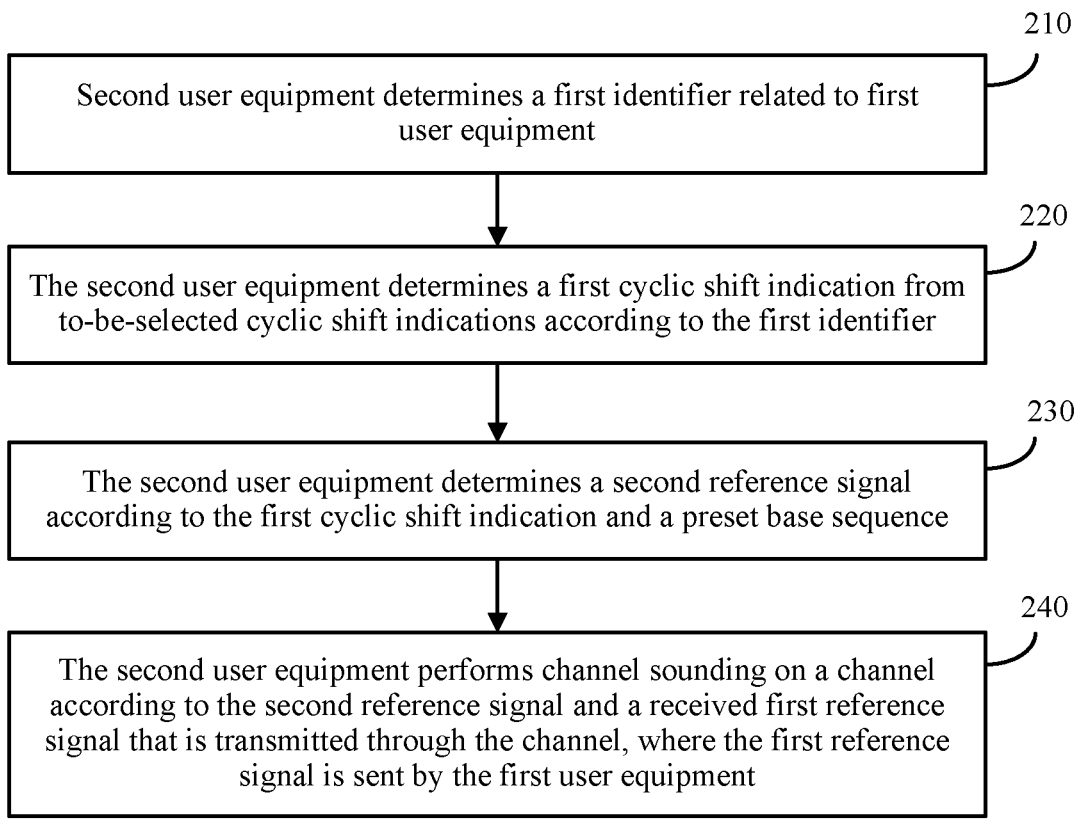
FIG. 2 is a schematic flowchart of a reference signal transmission method according to another embodiment of the present invention.

FIG. 2 is a schematic flowchart of a reference signal transmission method according to another embodiment of the present invention. The method in FIG. 2 includes the following steps:

210. A second user equipment determines a first identifier related to a first user equipment.

220. The second user equipment determines a first cyclic shift indication from a to-be-selected cyclic shift indications according to the first identifier.

230. The second user equipment determines a second reference signal according to the first cyclic shift indication and a preset base sequence.

240. The second user equipment performs channel sounding on a channel according to the second reference signal and a received first reference signal that is transmitted through the channel, where the first reference signal is sent by the first user equipment.

It should be understood that the first reference signal is generated by the first user equipment on a basis of the first identifier, and therefore the first reference signal is the same as the second reference signal.

In this embodiment of the present invention, the second user equipment selects a first cyclic shift indication according to a first identifier related to the first user equipment, determines a second reference signal on a basis of the first cyclic shift indication and a preset base sequence, and then performs channel sounding on a channel according to the second reference signal and a received first reference signal that is transmitted through the channel, thereby implementing reference signal transmission in D2D communication. The technical solution is used, so that the second user equipment does not need to use a blind detection manner, complexity of channel sounding is reduced, and energy consumption of the second user equipment is reduced.

Optionally, in an embodiment, step 210 includes: determining, by the second user equipment, the first identifier according to a request that is sent to the first user equipment and that carries the first identifier.

When the second user equipment sends the request, the second user equipment adds the first identifier to the request. The first user equipment that receives the request selects a cyclic shift indication by using the first identifier and generates the first reference signal, and the second user equipment also selects a cyclic shift indication by using the first identifier and generates the second reference signal, which is equivalent to that the second user equipment learns in advance which cyclic shift indication is used to generate the reference signal sent by the first user equipment, but does not need to perform determining in a blind detection manner, so that complexity of channel sounding performed by the second user equipment is reduced significantly.

Optionally, in another embodiment, step 230 includes: obtaining, by the second user equipment, the second reference signal after performing a cyclic shift on the preset base sequence according to the first cyclic shift indication.

Optionally, in another embodiment, step 220 includes: determining, by the second user equipment, a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=\mod(m_1, n)$.

Optionally, in another embodiment, the first identifier includes one identifier of the first user equipment, and $m_1$ is equal to a value of the first identifier.

Optionally, in another embodiment, the first identifier includes at least two identifiers of the first user equipment, and $m_1$ is a value determined on a basis of values of the at least two identifiers according to a preset operation rule.

Optionally, in another embodiment, step 220 includes: determining, by the second user equipment, the first cyclic shift indication according to a value of the first identifier and a first parameter of a resource used to send the first reference signal.

Optionally, in another embodiment, step 220 includes: determining, by the second user equipment, a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=\mod(m_2, n)$.

Optionally, in another embodiment, the first parameter includes one or more of the following parameters corresponding to the resource: a frame number, a subframe number, a physical resource block number, or bandwidth.

Optionally, in another embodiment, step 220 includes: determining, by the second user equipment, the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

Optionally, in another embodiment, step 220 includes: determining, by the second user equipment, the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

Optionally, in another embodiment, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

The foregoing describes in detail the reference signal transmission method according to the embodiments of the present invention with reference to FIG. 1 to FIG. 2. The following describes user equipment in detail according to embodiments of the present invention with reference to FIG. 3 to FIG. 4.

Figure 3:
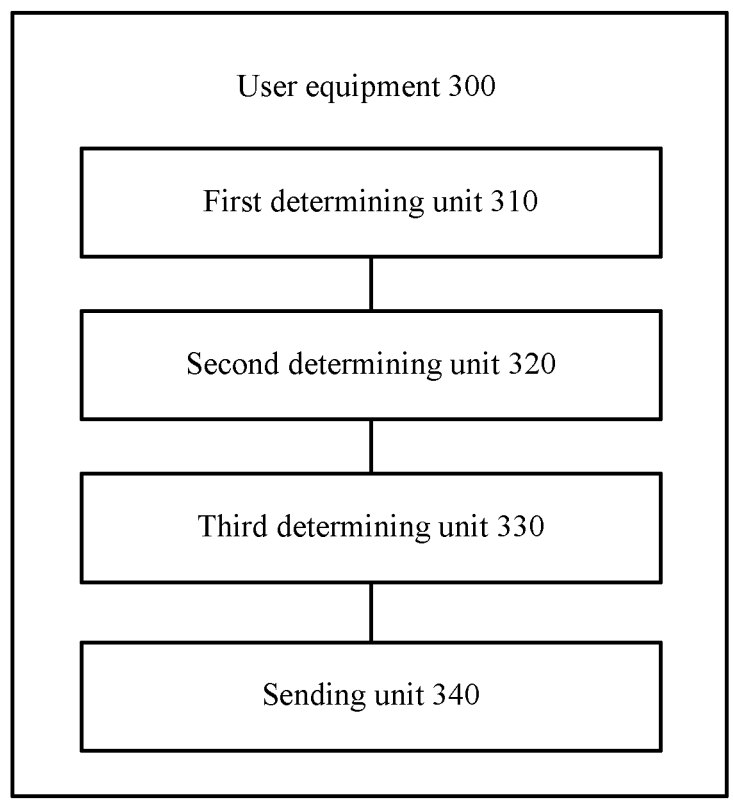
FIG. 3 is a schematic block diagram of user equipment according to an embodiment of the present invention.

FIG. 3 is a schematic block diagram of user equipment according to an embodiment of the present invention. User equipment 300 in FIG. 3 is corresponding to the first user equipment in FIG. 1 and FIG. 2. The user equipment 300 includes a first determining unit 310, a second determining unit 320, a third determining unit 330, and a sending unit 340.

The first determining unit 310 is configured to determine a first identifier related to the user equipment 300.

The second determining unit 320 is configured to determine a first cyclic shift indication from to-be-selected cyclic shift indications according to the first identifier determined by the first determining unit 310.

The third determining unit 330 is configured to determine a first reference signal according to the first cyclic shift indication determined by the second determining unit 320 and a preset base sequence.

The sending unit 340 is configured to send the first reference signal determined by the third determining unit 330 to second user equipment.

In this embodiment of the present invention, the user equipment 300 selects a first cyclic shift indication according to a first identifier related to the user equipment 300, generates a first reference signal on a basis of the first cyclic shift indication and a preset base sequence, and then sends the first reference signal to second user equipment, thereby implementing reference signal transmission in D2D communication.

Further, the user equipment 300 selects a cyclic shift indication according to the first identifier of the user equipment 300. The first identifier is related to the user equipment 300, and first identifiers of different user equipments are generally different from each other. Therefore, there is a low probability that the different user equipments select a same cyclic shift indication on a basis of the first identifiers of the different user equipments. Accordingly, there is a low probability that a conflict occurs between generated reference signals, and interference between the reference signals sent between the user equipments in the D2D communication is reduced.

Optionally, in an embodiment, the user equipment 300 further includes a receiving unit, where the receiving unit is configured to receive a request that is sent by the second user equipment and that carries the first identifier; and the first determining unit 310 is specifically configured to determine the first identifier according to the first identifier carried in the request received by the receiving unit.

Optionally, in another embodiment, the first determining unit 310 is specifically configured to select, according to a preset rule from an identifier related to the user equipment 300, an identifier as the first identifier.

Optionally, in another embodiment, the third determining unit 330 is specifically configured to obtain the first reference signal after performing a cyclic shift on the preset base sequence according to the first cyclic shift indication.

Optionally, in another embodiment, the second determining unit 320 is specifically configured to determine a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=\text{mod}(m_1, n)$.

Optionally, in another embodiment, the first identifier includes one identifier of the user equipment 300, and $m_1$ is equal to a value of the first identifier.

Optionally, in another embodiment, the first identifier includes at least two identifiers of the user equipment 300, and $m_1$ is a value determined on a basis of values of the at least two identifiers according to a preset operation rule.

Optionally, in another embodiment, the second determining unit 320 is specifically configured to determine the first cyclic shift indication according to a value of the first identifier and a first parameter of a resource used to send the first reference signal.

Optionally, in another embodiment, the second determining unit 320 is specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=\text{mod}(m_2, n)$.

Optionally, in another embodiment, the first parameter includes one or more of the following parameters corresponding to the resource: a frame number, a subframe number, a physical resource block number, or bandwidth.

Optionally, in another embodiment, the second determining unit 320 is further specifically configured to determine the first cyclic shift indication according to the value of the first identifier, the value of the first parameter, and a first offset value, where the first offset value is a cell identifier value of a cell in which the user equipment 300 is located, an identifier value of a D2D cluster to which the user equipment 300 belongs, or an offset value configured by a first communications device.

Optionally, in another embodiment, the second determining unit 320 is further specifically configured to: determine the first cyclic shift indication according to a value of the first identifier and a first offset value, where the first offset value is a cell identifier value of a cell in which the user equipment 300 is located, an identifier value of a D2D cluster to which the user equipment 300 belongs, or an offset value configured by a first communications device.

Optionally, in another embodiment, the first identifier includes one or more of the following identifiers of the user equipment 300: a D2D identifier, an IMSI, a TMSI, a D2D user group identifier, a service type identifier, or a D2D cluster identifier, where the D2D user group identifier is used to indicate a D2D user group to which the user equipment 300 belongs, and the service type identifier is used to indicate a service type provided by the user equipment 300.

Figure 4:
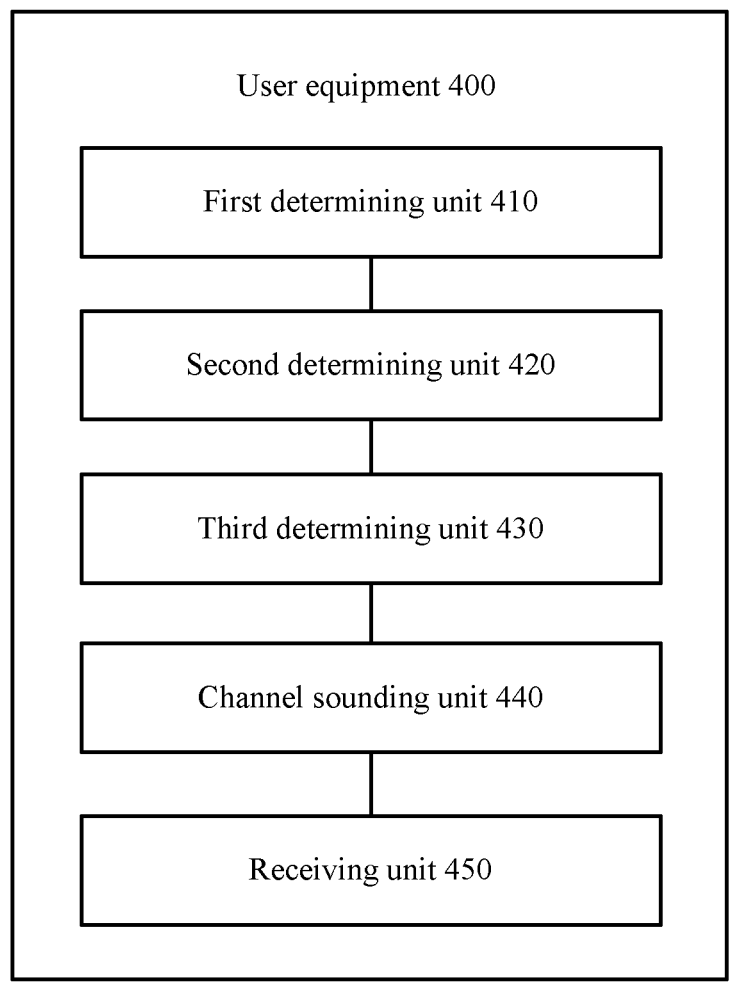
FIG. 4 is a schematic block diagram of user equipment according to an embodiment of the present invention.

FIG. 4 is a schematic block diagram of user equipment according to an embodiment of the present invention. User equipment 400 in FIG. 4 is corresponding to the second user equipment in FIG. 1 and FIG. 2. The user equipment 400 includes a first determining unit 410, a second determining unit 420, a third determining unit 430, a channel sounding unit 440, and a receiving unit 450.

The first determining unit 410 is configured to determine a first identifier related to the first user equipment.

The second determining unit 420 is configured to determine a first cyclic shift indication from to-be-selected cyclic shift indications according to the first identifier determined by the first determining unit 410.

The third determining unit 430 is configured to determine a second reference signal according to the first cyclic shift indication determined by the second determining unit 420 and a preset base sequence.

The receiving unit 450 is configured to receive a first reference signal transmitted through a channel, where the first reference signal is sent by the first user equipment.

The channel sounding unit 440 is configured to perform channel sounding on a channel according to the second reference signal determined by the third determining unit 430 and the first reference signal received by the receiving unit 450.

In this embodiment of the present invention, the user equipment 400 selects a first cyclic shift indication according to a first identifier related to first user equipment, determines a second reference signal on a basis of the first cyclic shift indication and a preset base sequence, and then performs channel sounding on a channel according to the second reference signal and a received first reference signal that is transmitted through the channel, thereby implementing reference signal transmission in D2D communication. The technical solution is used, so that the user equipment 400 does not need to use a blind detection manner, complexity of channel sounding is reduced, and energy consumption of the user equipment 400 is reduced.

Optionally, in an embodiment, the user equipment 400 further includes a sending unit, where the sending unit is configured to send, to the first user equipment, a request that carries the first identifier; and the first determining unit 410 is specifically configured to determine the first identifier according to the request that is sent by the sending unit and that carries the first identifier.

Optionally, in another embodiment, the third determining unit 430 is specifically configured to obtain the second reference signal after performing a cyclic shift on the preset base sequence according to the first cyclic shift indication.

Optionally, in another embodiment, the second determining unit 420 is specifically configured to determine a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=\mod(m_1, n)$.

Optionally, in another embodiment, the first identifier includes one identifier of the first user equipment, and $m_1$ is equal to a value of the first identifier.

Optionally, in another embodiment, the first identifier includes at least two identifiers of the first user equipment, and $m_1$ is a value determined on a basis of values of the at least two identifiers according to a preset operation rule.

Optionally, in another embodiment, the second determining unit 420 is specifically configured to determine the first cyclic shift indication according to a value of the first identifier and a value of a first parameter of a resource used to send the first reference signal.

Optionally, in another embodiment, the second determining unit 420 is further specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=\mod(m_2, n)$.

Optionally, in another embodiment, the first parameter includes one or more of the following parameters corresponding to the resource: a frame number, a subframe number, a physical resource block number, or bandwidth.

Optionally, in another embodiment, the second determining unit 420 is further specifically configured to determine the first cyclic shift indication according to the value of the first identifier, the first parameter, and a first offset value, where the first offset value is a cell identifier value of a cell in which the first user equipment is located, an identifier value of a D2D cluster to which the first user equipment belongs, or an offset value configured by a first communications device.

Optionally, in another embodiment, the second determining unit 420 is specifically configured to determine the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

Optionally, in another embodiment, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

Figure 5:
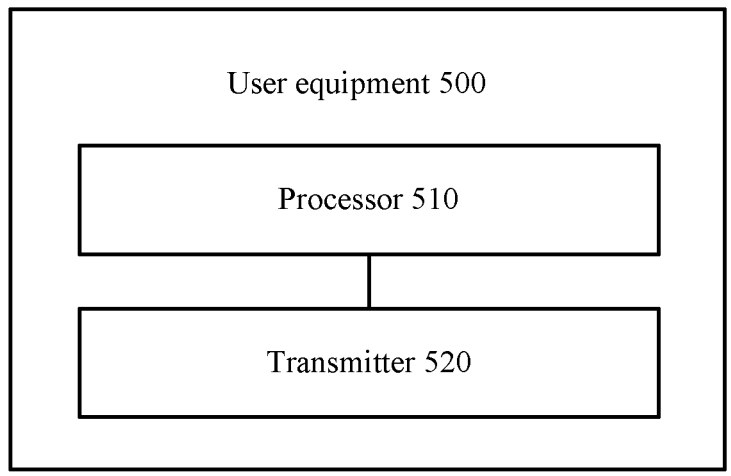
FIG. 5 is a schematic block diagram of user equipment according to an embodiment of the present invention.

FIG. 5 is a schematic block diagram of user equipment according to an embodiment of the present invention. User equipment 500 in FIG. 5 is corresponding to the first user equipment in FIG. 1 and FIG. 2. The user equipment 500 includes a processor 510 and a transmitter 520.

The processor 510 is configured to: determine a first identifier related to the user equipment 500, determine a first cyclic shift indication from to-be-selected cyclic shift indications according to the first identifier, and determine a first reference signal according to the first cyclic shift indication and a preset base sequence.

The transmitter 520 is configured to send the first reference signal to second user equipment.

In this embodiment of the present invention, to-be-selected cyclic shift indications is preset, and the user equipment 500 selects a first cyclic shift indication according to a first identifier related to the user equipment 500, generates a first reference signal on a basis of the first cyclic shift indication and a preset base sequence, and then sends the first reference signal to second user equipment, thereby implementing reference signal transmission in D2D communication.

Further, the user equipment 500 selects a cyclic shift indication according to the first identifier of the user equipment 500. The first identifier is related to the user equipment 500, and first identifiers of different user equipments are generally different from each other. Therefore, there is a low probability that the different user equipments select a same cyclic shift indication on a basis of the first identifiers of the different user equipments. Accordingly, there is a low probability that a conflict occurs between generated reference signals, and interference between the reference signals sent between the user equipments in the D2D communication is reduced.

Optionally, in an embodiment, the user equipment 500 further includes a receiver, configured to receive a request that is sent by the second user equipment and that carries the first identifier; and the processor 510 is specifically configured to determine the first identifier according to the first identifier carried in the request received by the receiver.

Optionally, in another embodiment, the processor 510 is specifically configured to select, according to a preset rule from an identifier related to the user equipment 500, an identifier as the first identifier.

Optionally, in another embodiment, the processor 510 is specifically configured to obtain the first reference signal after performing a cyclic shift on the preset base sequence according to the first cyclic shift indication.

Optionally, in another embodiment, the processor 510 is specifically configured to determine a $k^{th}$ cyclic shift indication among n to-be-selected cyclic shift indications as the first cyclic shift indication, where n is a quantity of to-be-selected cyclic shift indications, $m_1$ is a value determined on a basis of the first identifier, and $k=mod(m_1, n)$.

Optionally, in another embodiment, the first identifier includes one identifier of the user equipment 500, and $m_1$ is equal to a value of the first identifier.

Optionally, in another embodiment, the first identifier includes at least two identifiers of the user equipment 500, and $m_1$ is a value determined on a basis of values of the at least two identifiers according to a preset operation rule.

Optionally, in another embodiment, the processor 510 is specifically configured to determine the first cyclic shift indication according to a value of the first identifier and a first parameter of a resource used to send the first reference signal.

Optionally, in another embodiment, the processor 510 is specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=mod(m_2, n)$.

Optionally, in another embodiment, the first parameter includes one or more of the following parameters corresponding to the resource: a frame number, a subframe number, a physical resource block number, or bandwidth.

Optionally, in another embodiment, the processor 510 is further specifically configured to determine the first cyclic shift indication according to the value of the first identifier, the value of the first parameter, and a first offset value, where the first offset value is a cell identifier value of a cell in which the user equipment 500 is located, an identifier value of a D2D cluster to which the user equipment 500 belongs, or an offset value configured by a first communications device.

Optionally, in another embodiment, the processor 510 is further specifically configured to: determine the first cyclic shift indication according to a value of the first identifier and a first offset value, where the first offset value is a cell identifier value of a cell in which the user equipment 500 is located, an identifier value of a D2D cluster to which the user equipment 500 belongs, or an offset value configured by a first communications device.

Optionally, in another embodiment, the first identifier includes one or more of the following identifiers of the user equipment 500: a D2D identifier, an IMSI, a TMSI, a D2D user group identifier, a service type identifier, or a D2D cluster identifier, where the D2D user group identifier is used to indicate a D2D user group to which the user equipment 500 belongs, and the service type identifier is used to indicate a service type provided by the user equipment 500.

Figure 6:
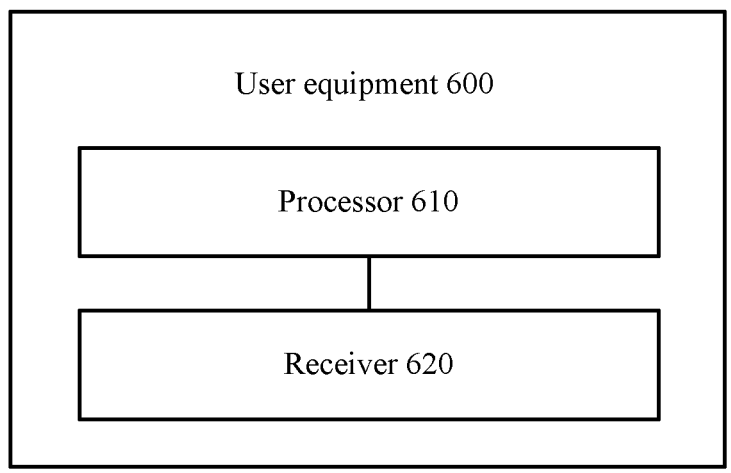
FIG. 6 is a schematic block diagram of user equipment according to an embodiment of the present invention.

FIG. 6 is a schematic block diagram of user equipment according to an embodiment of the present invention. User equipment 600 in FIG. 6 is corresponding to the second user equipment in FIG. 1 and FIG. 2. The user equipment 600 includes a processor 610 and a receiver 620.

The processor 610 is configured to: determine a first identifier related to first user equipment, determine a first cyclic shift indication from to-be-selected cyclic shift indications according to the first identifier, and determine a second reference signal according to the first cyclic shift indication and a preset base sequence.

The receiver 620 is configured to receive a first reference signal transmitted through a channel, where the first reference signal is sent by the first user equipment.

The processor 610 is further configured to perform channel sounding on a channel according to the determined second reference signal and the first reference signal received by the receiver 620.

In this embodiment of the present invention, the user equipment 600 selects a first cyclic shift indication according to a first identifier related to first user equipment, generates a second reference signal on a basis of the first cyclic shift indication and a preset base sequence, and then performs channel sounding on a channel according to the second reference signal and a received first reference signal that is transmitted through the channel, thereby implementing reference signal transmission in D2D communication. The technical solution is used, so that the user equipment 600 does not need to use a blind detection manner, complexity of channel sounding is reduced, and energy consumption of the user equipment 600 is reduced.

Optionally, in an embodiment, the user equipment 600 further includes a transmitter, configured to send, to the first user equipment, a request that carries the first identifier; and the processor 610 is specifically configured to determine the first identifier according to the request that is sent by the transmitter and that carries the first identifier.

Optionally, in another embodiment, the processor 610 is specifically configured to obtain the second reference signal after performing a cyclic shift on the preset base sequence according to the first cyclic shift indication.

Optionally, in another embodiment, the processor 610 is specifically configured to determine a $k^{th}$ cyclic shift indication among n to-be-selected cyclic shift indications as the first cyclic shift indication, where n is a quantity of to-beselected cyclic shift indications, $m_1$ is a value determined on a basis of the first identifier, and $k=\mathrm{mod}(m_1, n)$.

Optionally, in another embodiment, the first identifier includes one identifier of the first user equipment, and $m_1$ is equal to a value of the first identifier.

Optionally, in another embodiment, the first identifier includes at least two identifiers of the first user equipment, and $m_1$ is a value determined on a basis of values of the at least two identifiers according to a preset operation rule.

Optionally, in another embodiment, the processor 610 is specifically configured to determine the first cyclic shift indication according to a value of the first identifier and a value of a first parameter of a resource used to send the first reference signal.

Optionally, in another embodiment, the processor bio is further specifically configured to determine a $k^{th}$ cyclic shift indication among n to-be-selected cyclic shift indications as the first cyclic shift indication, where n is a quantity of to-be-selected cyclic shift indications, $m_2$ is a value determined on a basis of the value of the first identifier and the value of the first parameter according to a preset operation rule, and $k=\mathrm{mod}(m_2, n)$.

Optionally, in another embodiment, the first parameter includes one or more of the following parameters corresponding to the resource: a frame number, a subframe number, a physical resource block number, or bandwidth.

Optionally, in another embodiment, the processor bio is further specifically configured to determine the first cyclic shift indication according to the value of the first identifier, the value of the first parameter, and a first offset value, where the first offset value is a cell identifier value of a cell in which the first user equipment is located, an identifier value of a D2D cluster to which the first user equipment belongs, or an offset value configured by a first communications device.

Optionally, in another embodiment, the processor bio is specifically configured to determine the first cyclic shift indication according to a value of the first identifier and a first offset value, where the first offset value is a cell identifier value of a cell in which the first user equipment is located, an identifier value of a D2D cluster to which the first user equipment belongs, or an offset value configured by a first communications device.

Optionally, in another embodiment, the first identifier includes one or more of the following identifiers of the first user equipment: a D2D identifier, an IMSI, a TMSI, a D2D user group identifier, a service type identifier, or a D2D cluster identifier, where the D2D user group identifier is used to indicate a D2D user group to which the first user equipment belongs, and the service type identifier is used to indicate a service type provided by the first user equipment.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of the present invention.

It may be clearly understood by a person skilled in the art that, for the purpose of convenient and brief description, for a detailed working process of the foregoing system, apparatus, and unit, reference may be made to a corresponding process in the foregoing method embodiments, and details are not described herein.

In the several embodiments provided in the present application, it should be understood that the disclosed system, apparatus, and method may be implemented in other manners. For example, the described apparatus embodiment is merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected according to actual needs to achieve the objectives of the solutions of the embodiments.

In addition, functional units in the embodiments of the present invention may be integrated into one processing unit, or each of the units may exist alone physically, or two or more units are integrated into one unit.

When the functions are implemented in the form of a software functional unit and sold or used as an independent product, the functions may be stored in a computer-readable storage medium. On a basis of such an understanding, the technical solutions of the present invention essentially, or the part contributing to the prior art, or some of the technical solutions may be implemented in a form of a software product. The computer software product is stored in a storage medium, and includes several instructions for instructing a computer device (which may be a personal computer, a server, a network device, or the like) to perform all or some of the steps of the methods described in the embodiments of the present invention. The foregoing storage medium includes: any medium that can store program code, such as a USB flash drive, a removable hard disk, a read-only memory (ROM, Read-Only Memory), a random access memory (RAM, Random Access Memory), a magnetic disk, or an optical disc.

The foregoing descriptions are merely specific implementation manners of the present invention, but are not intended to limit the protection scope of the present invention. Any variation or replacement readily figured out by a person skilled in the art within the technical scope disclosed in the present invention shall fall within the protection scope of the present invention. Therefore, the protection scope of the present invention shall be subject to the protection scope of the claims.

The invention claimed is:

1. A method implemented by first user equipment, comprising:
   determining a first identifier;
   determining a first cyclic shift indication from multiple to-be-selected cyclic shift indications according to a first identifier, comprising:
   determining, a Kth cyclic shift indication from 8 to-be-selected cyclic shift indications as the first cyclic shift indication, wherein $K=\mathrm{mod}(m1, 8)$, where m1 is a value determined according to a value of the first identifier;

determining a first reference signal according to the first cyclic shift indication and a base sequence; and sending the first reference signal.

2. The method according to claim 1, wherein m1 is determined further based on a value of a first parameter of a resource used to send the first reference signal.

3. The method according to claim 1, wherein the first identifier is related to the first user equipment.

4. The method according to claim 1, wherein the first user equipment is a vehicle.

5. The method according to claim 1, wherein the 8 to-be-selected cyclic shift indications are preconfigured.

6. The method according to claim 1, the base sequence is a preset base sequence.

7. The method according to claim 1, wherein determining the first identifier comprises selecting, according to a preset rule from an identifier related to the first user equipment, an identifier as the first identifier.

8. The method according to claim 1, wherein the first reference signal is a DMRS signal.

9. The method according to claim 1, wherein the first identifier is a identifier of a user group.

10. The method according to claim 1, wherein the sending the first reference signal comprises:

sending the first reference signal to a second user equipment.

11. A user equipment, comprising:

a processor; and a non-transitory computer readable storage medium storing a program for execution by the processor, the program including instructions to:

determining a first identifier;

determining a first cyclic shift indication from multiple to-be-selected cyclic shift indications according to a first identifier, comprising:

determining, a Kth cyclic shift indication from 8 to-be-selected cyclic shift indications as the first cyclic shift indication, wherein K=mod(m1, 8), the m1 is a value determined according to a value of the first identifier;

determining a first reference signal according to the first cyclic shift indication and a base sequence; and sending the first reference signal.

12. The user equipment according to claim 11, wherein m1 is a valued determined further based on a value of a first parameter of a resource used to send the first reference signal.

13. The user equipment according to claim 11, wherein the first identifier is related to the first user equipment.

14. The user equipment according to claim 11, wherein the first user equipment is a vehicle.

15. The user equipment according to claim 11, wherein the 8 to-be-selected cyclic shift indications are preconfigured.

16. The user equipment according to claim 11, the base sequence is a preset base sequence.

17. The method according to claim 11, wherein determining the first identifier comprises Selecting, according to a preset rule from an identifier related to the first user equipment, an identifier as the first identifier.

18. The method according to claim 11, wherein the first reference signal is a DMRS signal.

19. A non-transitory computer-readable medium storing computer instructions for determining thermal insulation levels for clothing at a computer or mobile device, that when the computer instructions are executed by one or more processors, cause the one or more processors to perform the steps of:

determining a first identifier;

determining a first cyclic shift indication from multiple to-be-selected cyclic shift indications according to a first identifier, comprising:

determining, a Kth cyclic shift indication from 8 to-be-selected cyclic shift indications as the first cyclic shift indication, wherein K=mod(m1, 8), the m1 is a value determined according to a value of the first identifier;

determining a first reference signal according to the first cyclic shift indication and a base sequence; and sending the first reference signal.

20. The non-transitory computer-readable medium according to claim 19, wherein the first user equipment is a vehicle.

* * * * *